United States Patent [19]
Palm

[11] Patent Number: 5,607,023
[45] Date of Patent: *Mar. 4, 1997

[54] IMPACT ABSORPTION MECHANISM FOR POWER TOOLS

[75] Inventor: Bernhard Palm, Brookfield, Wis.

[73] Assignee: Milwaukee Electric Tool Corp., Brookfield, Wis.

[*] Notice: The term of this patent shall not extend beyond the expiration date of Pat. No. 5,566,458.

[21] Appl. No.: 443,784

[22] Filed: May 18, 1995

Related U.S. Application Data

[63] Continuation-in-part of Ser. No. 354,518, Dec. 13, 1994, abandoned, and Ser. No. 354,560, Dec. 13, 1994, abandoned.

[51] Int. Cl.⁶ .................................. B23Q 5/56; F16D 7/02
[52] U.S. Cl. .......................... 173/178; 30/392; 74/411; 464/45; 464/89; 464/182
[58] Field of Search .................................... 74/411; 464/30, 464/41, 42, 45, 46, 89, 91, 182; 173/176, 178

[56] References Cited

U.S. PATENT DOCUMENTS

| | | |
|---|---|---|
| 1,744,976 | 1/1930 | Levedahl . |
| 2,566,183 | 8/1951 | Forss . |
| 2,639,737 | 5/1953 | Forsberg . |
| 2,790,471 | 4/1957 | Graybill . |
| 2,848,884 | 8/1958 | Maude ........................ 464/91 X |
| 3,170,496 | 2/1965 | Kohler et al. . |
| 3,406,583 | 10/1968 | Baier ........................ 464/30 X |
| 3,454,059 | 7/1969 | Sindelar . |
| 3,527,273 | 9/1970 | Falter . |
| 3,657,813 | 4/1972 | Knight . |
| 3,934,629 | 1/1976 | Boman . |
| 3,937,036 | 2/1976 | Sauerwein . |
| 3,943,800 | 3/1976 | Lesner . |
| 3,971,132 | 7/1976 | Griffles et al. . |
| 4,006,785 | 2/1977 | Roll et al. . |
| 4,180,990 | 1/1980 | Hill ........................ 464/42 X |
| 4,220,230 | 9/1980 | Hansen . |
| 4,265,320 | 5/1981 | Tanaka et al. . |
| 4,338,798 | 7/1982 | Gilman ........................ 464/41 X |
| 4,365,962 | 12/1982 | Regelsberger . |
| 4,418,766 | 12/1983 | Grossmann . |
| 4,436,163 | 3/1984 | Simpson . |
| 4,448,098 | 5/1984 | Totsu . |
| 4,448,261 | 5/1984 | Kowak et al. . |
| 4,630,512 | 12/1986 | Durr . |
| 4,655,103 | 4/1987 | Schreibert et al. . |
| 4,676,001 | 6/1987 | Wagner . |
| 4,699,036 | 10/1987 | Henne . |
| 4,721,169 | 6/1988 | Nagasawa et al. . |
| 4,776,406 | 10/1988 | Wagner . |
| 4,809,572 | 3/1989 | Sasaki . |
| 4,901,610 | 2/1990 | Larson et al. . |
| 4,967,888 | 11/1990 | Lippacher et al. . |
| 4,976,164 | 12/1990 | Lentino . |
| 5,005,684 | 4/1991 | Fujii . |
| 5,025,562 | 6/1991 | Palm . |
| 5,050,307 | 9/1991 | Palm ........................ 30/392 |
| 5,060,733 | 10/1991 | Kraus . |
| 5,079,844 | 1/1992 | Palm . |
| 5,092,441 | 3/1992 | Fujii . |
| 5,113,951 | 5/1992 | Houben et al. . |
| 5,129,465 | 7/1992 | Rahn . |
| 5,138,916 | 8/1992 | Seto et al. . |

FOREIGN PATENT DOCUMENTS

| | | |
|---|---|---|
| 9301295 | 12/1993 | Germany . |
| 635227 | 4/1950 | United Kingdom . |
| 2042973 | 10/1980 | United Kingdom . |
| 1596408 | 8/1981 | United Kingdom . |
| 2181693 | 4/1987 | United Kingdom . |

*Primary Examiner*—Jeanne M. Elpel
*Assistant Examiner*—Jay A. Stelacone
*Attorney, Agent, or Firm*—Michael, Best & Friedrich

[57] ABSTRACT

Disclosed herein is an impact absorption mechanism and a power tool including an impact absorption mechanism. When a tool bit binds a high energy impulse of short duration is generated that may damage components of the power tool. The impact absorption mechanism absorbs this high energy impulse and prevents damage to other components of the power tool.

7 Claims, 8 Drawing Sheets

IMPACT ABSORPTION MECHANISM FOR POWER TOOLS

This application is a continuation-in-part of U.S. patent applications Ser. No. 08/354,518, now abandoned entitled "Reciprocating Saw Clutch", and Ser. No. 08/354,560, now abandoned entitled "Drive Mechanism for Power Tool", both filed Dec. 13, 1994.

FIELD OF THE INVENTION

The invention relates to impact absorption mechanisms that are suitable for use in handheld power tools.

BACKGROUND OF THE INVENTION

Reciprocating and rotating drive mechanisms are known in the art. See, for example, U.S. Pat. No. 5,050,307, issued to Palm on Sep. 24, 1991, U.S. Pat. No. 5,025,562, issued to Palm on Jun. 25, 1991, and U.S. Pat. No. 5,079,844, issued to Palm on Jan. 14, 1992, each of which is assigned to the assignee of the present invention, and is incorporated herein by reference.

Reciprocating drive mechanisms are found, for example, in reciprocating saws. Such reciprocating saws typically include a housing including a gear case, a motor in the housing having a motor shaft, a jackshaft mounted in the housing parallel to the motor shaft, and a gear and pinion connecting the motor shaft to the jackshaft. A primary wobble plate, including a drive arm, is mounted on the jackshaft, and a tubular spindle is mounted in the gear case for reciprocating motion. The spindle has a longitudinal slot, and the drive arm projects through the slot where it is connected to the portion of the spindle opposite the slot on the other side of the axis of the spindle. The drive arm reciprocates the spindle as the jackshaft is rotated. A secondary wobble plate is mounted on the jackshaft, and includes a drive arm for reciprocating a counterbalance that is coaxial with the spindle, to reduce vibration.

Some hand held electric tools, such as electric screwdrivers, include clutch mechanisms that activate at a torque less than the stalling torque of the motor in the tool. For example, when a screw driven by an electric screwdriver has been driven all the way into a wall, the clutch will activate to prevent stripping of the threads. Because the clutch activates at a torque less than the stalling torque of the motor, the motor in the tool continues to rotate after the clutch has activated.

Attention is directed to U.S. patent application Ser. No. 08/275,151, filed Jul. 14, 1994, which is assigned to the assignee of the present invention, and which is incorporated herein by reference.

SUMMARY OF THE INVENTION

The inventor of the present invention has recognized that in a handheld tool, the tool bit occasionally locks or binds, for example if a blade encounters a knot or nail in the wood being sawed, or is otherwise overloaded. Also, the spindle of a tool occasionally hits a work piece. Either situation creates a high energy impulse of short duration on the drive mechanism of the tool. Such an impulse can cause failure to occur in the tool. For example, wobble plates may bend, or bearings may be damaged.

Such an impulse can cause failure to occur at the gear and pinion. This is the most serious type of failure, as these parts are expensive to replace.

In a first aspect of the invention, there are provided impact absorption mechanisms that use radially directed forces to produce friction. In a second aspect of the invention, there are provided impact absorption mechanisms that use conically directed forces to produce friction. In these friction-type mechanisms, the mechanism is not activated and does not absorb any significant amount of impact energy until a threshold is reached, at which point the mechanism quickly absorbs most or all of the impact energy.

Third there are provided elastic-type impact absorption mechanisms. In this type, the mechanism is always absorbing the impact energy of both major and minor impacts that occur at the tool bit or spindle. By doing this, these mechanisms increase the life of the tool by absorbing minor impacts that would otherwise contribute to the overall wear-and-tear of the tool components.

One embodiment of the invention provides a handheld portable tool comprising a housing; a first shaft rotatably mounted in the housing; a motor shaft; a spindle; a tool bit driven by the spindle and adapted to operate on a workpiece; means, mounted on the first shaft and connected to the spindle, for converting rotational motion of the first shaft to reciprocal motion of the spindle; and means for drivingly connecting the motor shaft to the first shaft and providing slippage between the motor shaft and the first shaft if there is binding of the spindle.

Another embodiment of the invention provides an impact absorption mechanism for connecting a drive shaft to a driven shaft in a power tool comprising a first shaft; a second shaft; a gear that is drivingly connected to the first shaft and includes an inner surface; and a radial expansion ring that is fixedly mounted on the second shaft and includes an inner surface that is connected to the second shaft and an outer surface that is frictionally drivingly connected to the inner surface of the gear.

Another embodiment of the invention provides an impact absorption mechanism for connecting two drive shafts in a power tool comprising an inner hub drivingly connected to a first drive shaft and having an outer generally cylindrical surface; an outer hub having an inner generally cylindrical surface mounted on the outer surface of the inner hub, and an outer surface drivingly connected to a second drive shaft; a plurality of circumferentially distributed apertures extending through the inner hub and the outer hub where the inner hub interfaces with the outer hub; and energy absorption elements housed in the apertures.

Another embodiment of the invention provides a handheld portable tool comprising a housing; a first shaft rotatably mounted in the housing; a motor shaft; a spindle; a tool bit driven by the spindle and adapted to operate on a workpiece; means, mounted on the first shaft and connected to the spindle, for converting rotational motion of the first shaft to reciprocal motion of the spindle; and an impact absorption mechanism connecting the motor shaft to the first shaft and including an inner hub drivingly connected to the first shaft and having an outer generally cylindrical surface; an outer hub having an inner generally cylindrical surface mounted on the outer surface of the inner hub, and an outer surface drivingly connected to the motor shaft; a plurality of circumferentially distributed apertures extending through the inner hub and the outer hub where the inner hub interfaces with the outer hub; and energy absorption elements housed in the apertures.

Another embodiment of the invention provides an impact absorption mechanism for connecting two drive shafts in a power tool comprising an inner hub drivingly connected to a first drive shaft, and having an outer generally cylindrical surface; a plurality of circumferentially spaced indentations extending radially inwardly from the outer surface of the inner hub; an outer hub having an inner generally cylindrical surface rotatably mounted on the inner hub, the outer hub being drivingly connected to a second drive shaft; and a plurality of generally cylindrical spring pins mounted in the indentations and causing the outer hub to rotate with the inner hub except when a binding force is applied to one of the drive shafts that is greater than a predetermined force.

Another embodiment of the invention provides a hand-held portable tool comprising a housing; a first shaft rotatably mounted in the housing; a motor shaft; a spindle; a tool bit driven by the spindle and adapted to operate on a workpiece; means, mounted on the first shaft and connected to the spindle, for converting rotational motion of the first shaft to reciprocal motion of the spindle; and an impact absorption mechanism connecting the motor shaft to the first shaft and including an inner hub drivingly connected to the first shaft, and having an outer generally cylindrical surface; a plurality of circumferentially spaced indentations extending radially inwardly from the outer surface of the inner hub; an outer hub having an inner generally cylindrical surface rotatably mounted on the inner hub, the outer hub being drivingly connected to the motor shaft; and a plurality of generally cylindrical spring pins mounted in the indentations and causing the outer hub to rotate with the inner hub except when a binding force is applied to the tool bit that is greater than a predetermined force.

Another embodiment of the invention provides an impact absorption mechanism for connecting two drive shafts in a power tool comprising an inner hub drivingly connected to a first drive shaft, and having an outer generally cylindrical surface; a plurality of circumferentially spaced indentations extending radially inwardly from the outer surface of the inner hub; an outer hub having an inner generally cylindrical surface rotatably mounted on the inner hub, the outer hub being drivingly connected to a second drive shaft; a plurality of circumferentially spaced indentations extending radially outwardly from the inner surface of the outer hub, wherein the indentations on the outer hub align with the indentations on the inner hub; and a plurality of generally cylindrical spring pins mounted in the aligned indentations and causing the outer hub to rotate with the inner hub, wherein the spring pins absorb the impact energy resulting from an impact to the first drive shaft.

Another embodiment of the invention provides a hand-held portable tool comprising a housing; a first shaft rotatably mounted in the housing; a motor shaft; a spindle; a tool bit driven by the spindle and adapted to operate on a workpiece; means, mounted on the first shaft and connected to the spindle, for converting rotational motion of the first shaft to reciprocal motion of the spindle; and an impact absorption mechanism connecting the motor shaft to the first shaft and including an inner hub drivingly connected to the first shaft, and having an outer generally cylindrical surface; a plurality of circumferentially spaced indentations extending radially inwardly from the outer surface of the inner hub; an outer hub having an inner generally cylindrical surface rotatably mounted on the inner hub, the outer hub being drivingly connected to the motor shaft; a plurality of circumferentially spaced indentations extending radially outwardly from the inner surface of the outer hub, wherein the indentations on the outer hub align with the indentations on the inner hub; and a plurality of generally cylindrical spring pins mounted in the aligned indentations and causing the outer hub to rotate with the inner hub, wherein the spring pins absorb the impact energy resulting from an impact to the first drive shaft.

Another embodiment of the invention provides an impact absorption mechanism comprising a frictional drive member that is drivingly connected to a motor; a frictionally engaging inner surface on the drive member; a frictionally driven member that is drivingly connected to a tool bit; a frictionally engaging outer surface on the driven member that is juxtaposed with the inner surface of the drive member; and a tensioning device that applies a force pushing together the inner surface of the drive member and the outer surface of the driven member such that the surfaces are drivingly connected unless the force is overcome, whereupon the surfaces will move relative to one another.

Another embodiment of the invention provides an impact absorption mechanism comprising a frictional drive member that is drivingly connected to a motor; a first frictionally engaging inner surface on the drive member; a second frictionally engaging inner surface on the drive member; a first frictionally driven member that is drivingly connected to a tool bit, wherein the first driven member includes a first frictionally engaging outer surface that is juxtaposed with the first inner surface on the drive member; a second frictionally driven member that is drivingly connected to the tool bit, wherein the second driven member includes a second frictionally engaging outer surface that is juxtaposed with the second inner surface on the drive member; a tensioning device that applies a force pushing the first driven member towards the drive member and the second driven member such that the outer surfaces of the driven members and the inner surfaces of the drive member are drivingly connected unless the force is overcome, whereupon the surfaces will move relative to one another.

Other features and advantages of the invention will become apparent to those of ordinary skill in the art upon review of the following detailed description, claims, and drawings.

DESCRIPTION OF THE DRAWINGS

FIG. 9 is a side elevational view showing the embodiment of FIG. 8 after assembly, and in section.

DETAILED DESCRIPTION OF THE PREFERRED EMBODIMENT OF THE INVENTION

Shown in the various figures is a tool 9 of the type having a drive mechanism. Although, in the illustrated embodiment, a saw is shown, the invention has application in any tool having rotating parts. For example, the invention has application in tools having reciprocating and/or rotating drive mechanisms.

Figure 1:
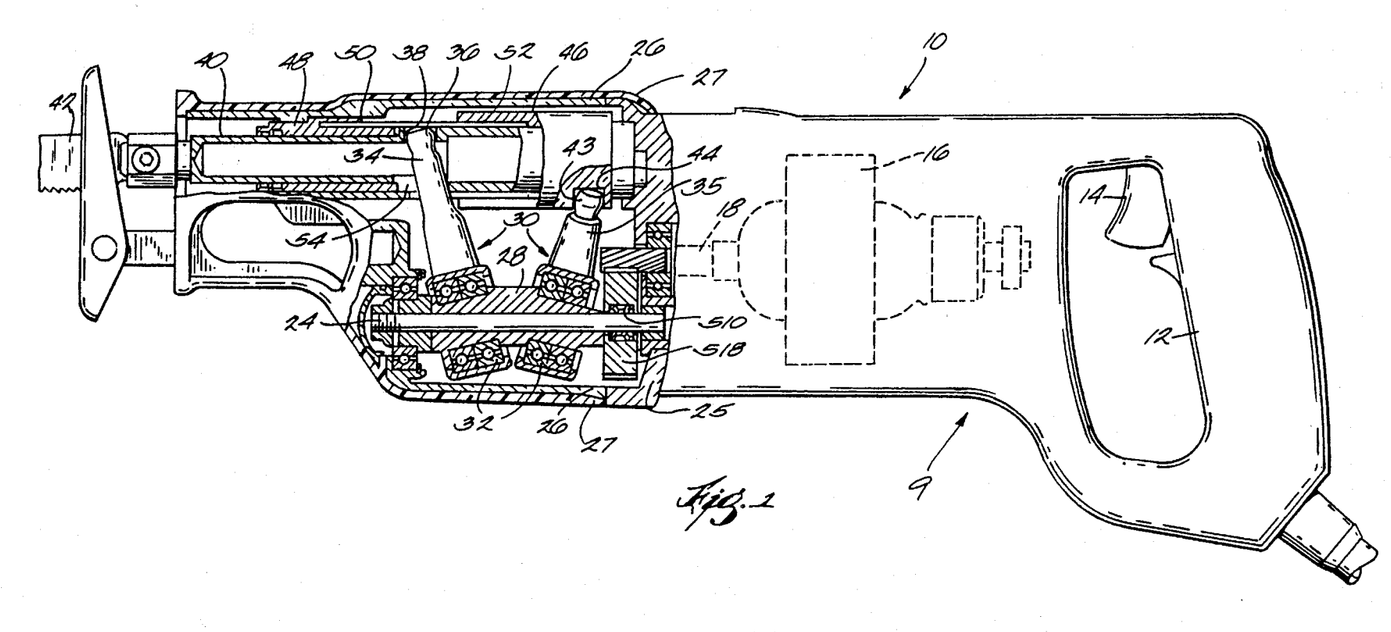
FIG. 1 is a side elevational view, partly in section, of a reciprocating saw embodying various features of the invention.

Referring to FIG. 1, the tool 9 includes a main body 10 which includes a handle portion 12. The tool 9 includes a motor 16 supported by the main body 10, and an on-off trigger switch 14 supported by the handle portion 12 and electrically connected to the motor 16 for controlling energization of the motor 16. The motor 16 includes a motor shaft 18.

The tool 9 further includes a gear case 26 and a diaphragm 25 in the main body 10, and a jackshaft 24 journaled in the gear case 26 and the diaphragm 25 and parallel to the motor shaft 18. The tool 9 further includes a urethane or rubber insulating "boot" 27 covering the gear case 26.

The tool 9 may further include means for converting rotary motion into reciprocating motion. In the illustrated embodiment, such means comprises a wobble plate drive member 28 fixed on the jackshaft 24, and two wobble plate assemblies 30 mounted on the wobble drive member 28. Other means can be employed for converting rotary motion into reciprocating motion. For example, the counterbalanced reciprocating mechanism described in U.S. Pat. No. 5,079,844, issued to Palm, can be employed. The wobble plate assemblies 30 convert rotary motion into reciprocating motion. Each wobble plate assembly 30 has an input bearing 32 mounted on the wobble plate member 28. The wobble plate assembly 30 on the left (in the figures) is a primary assembly, and the wobble plate assembly 30 on the right (in the figures) is a secondary assembly. Each wobble plate assembly 30 has a drive arm. The primary wobble plate assembly has a drive arm 34 having a somewhat spherical tip 36. The secondary wobble plate assembly has a drive arm 35 also having a somewhat spherical tip 43.

The tool 9 further includes a reciprocating tubular spindle 40 mounted in the gear case 26 for reciprocating motion parallel to the jackshaft 24. The spindle 40 includes a socket or hole 38 receiving the spherical tip 36 of the primary wobble plate assembly, and the spindle 40 is reciprocated by the primary wobble plate assembly. The spindle 40 further includes a slot 54 in the lower portion of the spindle 40, opposite the hole 38, for receiving the drive arm 34 of the primary wobble plate assembly. The spindle 40 selectively carries a tool bit 42 outside of the main body 10. The tool bit 42 is attached to or removed from the spindle 40 using a screw or other suitable attachment mechanism. The tool 9 further includes a reciprocating counterweight 46, mounted in the gear case 26 coaxial with the spindle 40 for reciprocation opposite to the reciprocation of the spindle 40 so as to reduce vibration. The counterweight 46 has a hole 44 receiving the spherical tip 43 of the secondary wobble plate assembly and the counterweight 46 is reciprocated by the secondary wobble plate assembly.

The tool 9 includes a spindle bearing 48 fixed in the gear case 26. The reciprocating spindle 40 slides inside of and is guided by the spindle bearing 48. The tool 9 further includes a sleeve 50 fixed on the outside of the bearing 48. The counterweight 46 slides on the outside of the sleeve 50. The sleeve 50 has opposed slots 52, and the drive arm 34 of the primary wobble plate assembly 30 projects through the bottom slot 52 in the sleeve 50, through the slot 54 in the spindle 40, so that the tip 36 can engage the socket or hole 38 in the top of the spindle 40. The sides of the slot 54 engage a cylindrical exterior portion of the drive arm 34, and this engagement prevents the spindle 40 from rotating about the spindle axis of reciprocation.

The tool 9 further includes means drivingly connecting the motor shaft 18 to the jackshaft 24 and providing impact absorption between the motor shaft 18 and the jackshaft 24 if there is binding of the spindle 40, such as if the tool bit 42 encounters a knot or a nail in a workpiece, or the spindle 40 hits the workpiece. In FIG. 1, a radial force device 510 is shown drivingly connecting the motor shaft 18 to the jackshaft 24. Of course, any of the impact absorption mechanisms shown in FIGS. 2–19 may serve this function.

There are generally three different aspects to the instant invention. A first aspect, shown in FIGS. 1–6 and 8–11, uses radially directed forces to produce friction, which friction is overcome when a sufficient force impacts on the tool 9. A second aspect, shown in FIGS. 16–19, uses conically directed forces to produce friction, which friction is overcome when a sufficient force impacts on the tool 9. In the third aspect, elastic-type impact absorption mechanisms are provided, as shown in FIGS. 7 and 12–15. Not only do the elastic-type embodiments provide significant give when a significant impact occurs, but they also provide a constant give for every minor impact during use. Thus, it is believed that the elastic-type impact absorption mechanisms will greatly extend the life of all of the drive components of the tool 9.

Figure 2:
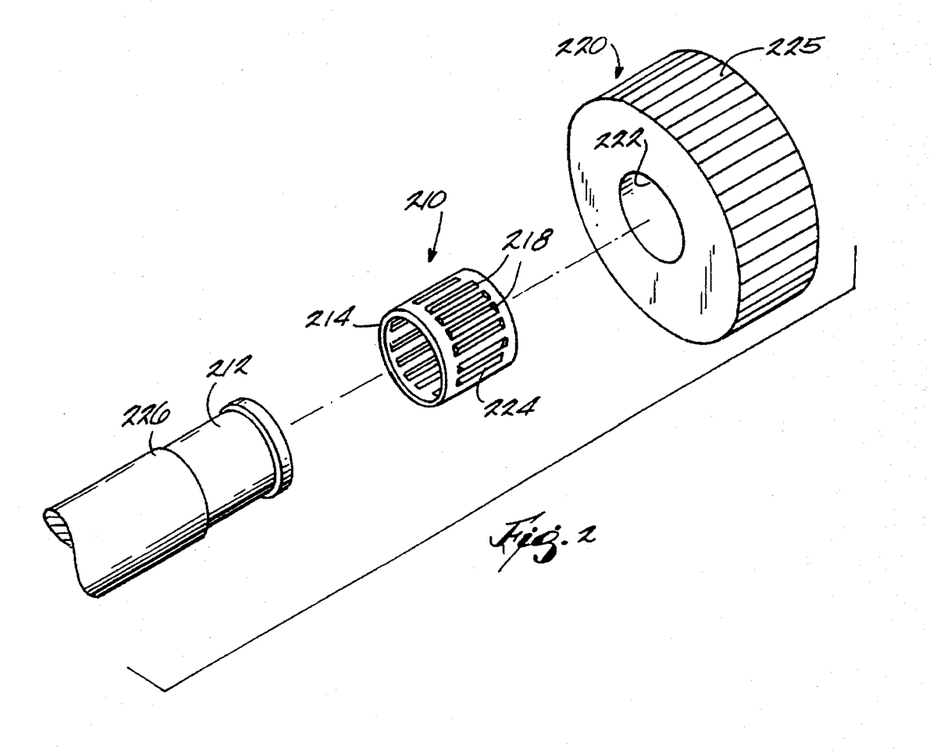
FIG. 2 is an exploded perspective view showing an embodiment of the invention.

An embodiment of the invention is shown in FIG. 2. More particularly, FIG. 2 shows an impact absorption mechanism that can be provided on either the motor shaft 18 or the jackshaft 24. The impact absorption mechanism of this embodiment includes means for providing force in a radial direction. More particularly, the means for providing force in a radial direction comprises a hollow, generally cylindrical radial expansion ring or tolerance ring 210 having an inner surface 214 mounted on a shaft 226 which can be a torque input shaft of the tool 9, such as the motor shaft 18, or a torque output shaft of the tool 9, such as the jackshaft 24. In the illustrated embodiment, the inner surface 214 is mounted on a reduced diameter portion 212 of the shaft 226; however, in other embodiments, the expansion ring 210 can be restrained against lateral movement by washers or other means instead of by using a reduced diameter portion. The radial expansion ring 210 has a length in the direction parallel to the axis of the reduced diameter portion 212. The radial expansion ring 210 has an exterior surface with a plurality of parallel, raised ribs 218 extending along the length of the radial expansion ring 210. The impact absorption mechanism of this embodiment further includes a gear or pulley 220 having an inner cylindrical surface 222 mounted on and frictionally engaging the exterior surface 224 of the radial expansion ring 210 and having an outer surface 225. For example, if the inner surface 214 is mounted on the jackshaft 24 of FIG. 1, then the outer surface 225 can have teeth journaled onto helical splines on the motor shaft 18. The radial expansion ring 210 will slip when the load on the spindle 40 or tool bit 42 is sufficiently high. More particularly, any stripping or damage that may occur, when the load on the spindle 40 or tool bit 42 is too high, will occur on the radial expansion ring 210 which is inexpensive relative to the gear 220 and driving pinion 56, and which can be inexpensively replaced. This prevents damage to the wobble plate assemblies 30 and the driving pinion 56, or damage to whatever other drive mechanism is used in the tool 9, when the tool bit 42 locks or binds, hits something like a knot or nail, or is otherwise overloaded.

Figure 3:
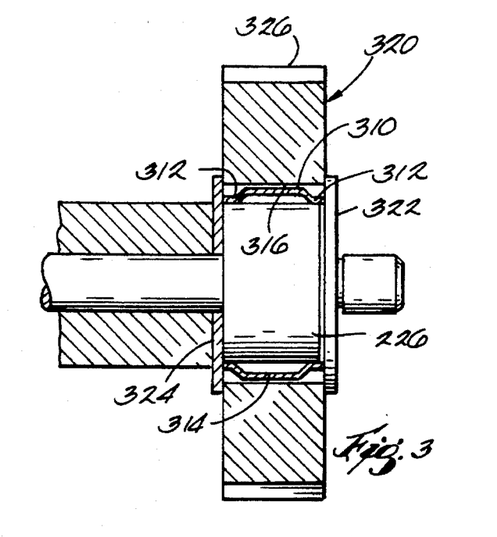
FIG. 3 is a side elevational view, partly in section, showing an alternative embodiment of the invention.

The radial expansion ring can be replaced with a radial force device 310 as shown in FIG. 3. The radial force device 310 is in the general shape of a ring which is resilient in the radial direction, which has axially spaced apart flanged ends 312 in contact with the shaft 226 and having a middle portion 314, axially between the ends 312, radially spaced from the shaft 226, and having an outer cylindrical surface in contact with and engaging the inner cylindrical surface 316 of a pulley or gear 320. Disks 322 and 324 on either side of the radial force device 310 have respective outer diameters that are greater than the outer diameter of the middle portion 314 and that are less than the inner diameter of the pulley or gear 320. The disks 322 and 324 restrain the radial force device 310 and the pulley or gear 320 against movement in the axial direction. If the radial force device 310 is mounted on the jackshaft 24 of FIG. 1, then the outer surface 326 of the pulley or gear 320 can have teeth journaled onto helical splines on the motor shaft 18. The radial force device 310 will slip when the load on the spindle 40 or tool bit 42 is sufficiently high. This prevents damage to the wobble plate assemblies 30 and the driving pinion 56, or damage to whatever other drive mechanism is used in the tool 9, when the tool bit 42 locks or binds, hits something like a knot or nail, or is otherwise overloaded.

Figure 4:
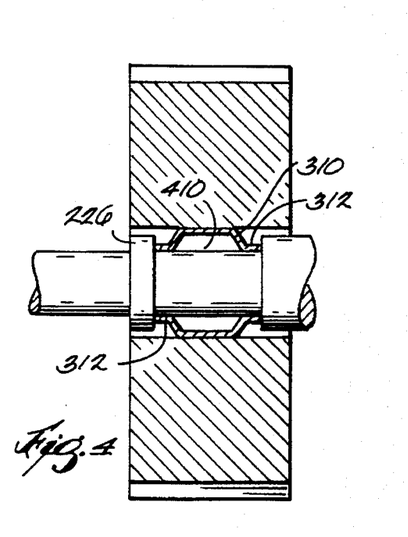
FIG. 4 is a side elevational view, partly in section, showing an alternative embodiment of the invention.

In an alternative embodiment of the invention, illustrated in FIG. 4, the ends 312 of the radial force device 310 can be housed or restrained against axial movement by a circumferential groove 410 in the shaft 226.

Figure 5:
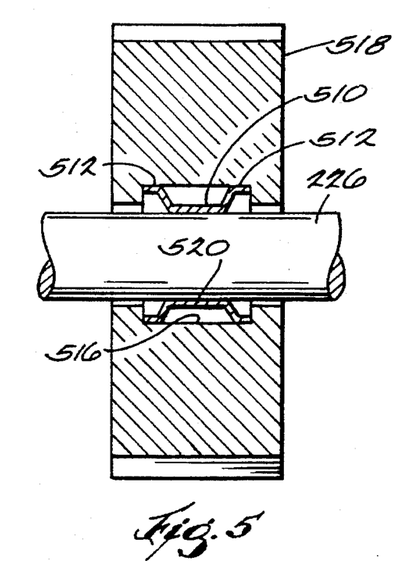
FIG. 5 is a side elevational view, partly in section, showing an alternative embodiment of the invention.

In another alternative embodiment of the invention, illustrated in FIG. 5, the radial force device 510 is in the general shape of a ring which is resilient in the radial direction, which has axially spaced apart flanged ends 512 housed in or restrained against axial movement by an inner groove 516 of a pulley or gear 518 and which has a middle portion 520, axially between the ends 512. The middle portion 520 is spaced radially inwardly from the groove 516, and has a cylindrical surface in contact with and engaging the shaft 226. The radial force device 510 causes the pulley or gear 518 to normally rotate with the shaft 226. If the shaft 226 is the jackshaft 24 of FIG. 1, then the outer circumferential surface of the pulley or gear 518 can have teeth that are journaled onto helical splines on the motor shaft 18. The radial force device 510 will slip when the load on the spindle 40 or tool bit 42 is sufficiently high. This prevents damage to the wobble plate assemblies 30 and the driving pinion 56, or damage to whatever other drive mechanism is used in the tool 9, when the tool bit 42 locks or binds, hits something like a knot or nail, or is otherwise overloaded.

Figure 6:
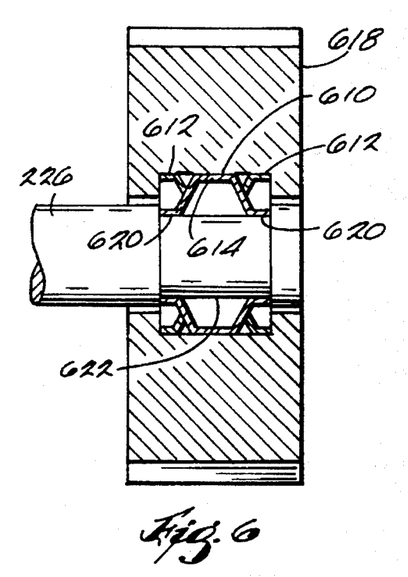
FIG. 6 is a side elevational view, partly in section, showing an alternative embodiment of the invention.

In another alternative embodiment of the invention, illustrated in FIG. 6, the radial force device 610 is in the general shape of a ring which is resilient in the radial direction, which has a first pair of axially spaced apart flanged ends 612 housed in or restrained against axial movement by an inner groove 614 in a pulley or gear 618 and which has a second pair of axially spaced apart flanged ends 620 housed in or restrained against axial movement by a circumferential groove or reduced diameter portion 622 in the shaft 226. The ends 612 and 620 of the radial force device 610 cause the pulley or gear 618 to normally rotate with the shaft 226. If the shaft 226 is the jackshaft 24 of FIG. 1, then the outer surface of the pulley or gear 618 can have teeth that are journaled onto helical splines on the motor shaft 18. The radial force device 610 will slip relative to the jackshaft 24 when the load on the spindle 40 or tool bit 42 is sufficiently high. This prevents damage to the wobble plate assemblies 30 and the driving pinion 56, or damage to whatever other drive mechanism is used in the tool 9, when the tool bit 42 locks or binds, hits something like a knot or nail, or is otherwise overloaded.

Certain impact absorption mechanisms, such as those illustrated in FIGS. 1–6 (as well as FIGS. 8–11 and 16–19, infra), rigidly connect the shaft 226 to the motor shaft 18, unless the tool bit 42 or the spindle 40 are subjected to a sufficiently great force to activate the impact absorption mechanism. Only then does this rigid type of impact absorption mechanism absorb the force transmitted into the tool 9 from the tool bit 42 or the spindle 40. These will be referred to as friction-type impact absorption mechanisms, as the components of the mechanism are held together through friction forces.

However, there are constantly occurring, during the normal use of the tool 9, small impacts to the tool bit 42 or the spindle 40 that are transmitted into the inner workings of the tool 9, such as the wobble plate assemblies 30 and the driving pinion 56. These constant minor impacts contribute significantly to the overall wear-and-tear of the tool 9.

Figure 7:
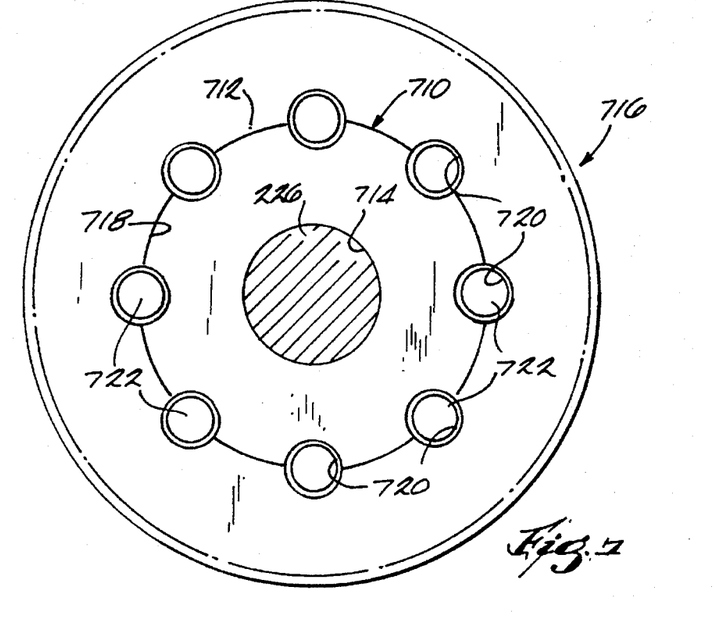
FIG. 7 is a front elevational view in section, showing an alternative embodiment of the invention.

In another alternative embodiment of the invention, shown in FIG. 7, there is an inner hub 710 including an outer cylindrical surface 712 and including an inner cylindrical surface 714 adapted to be mounted on the shaft 226, and an outer hub 716 having an inner cylindrical surface 718 mounted on the outer surface 712 of the inner hub 710. A plurality of circumferentially distributed apertures 720 extend through the interface of the inner hub 710 and outer hub 716, and energy absorbing elements 722 are housed in the apertures 720. The elements 722 must be made of a resilient material such as urethane, rubber, elastomer, certain plastics, or any material which can absorb energy by deforming and then return to its original shape.

If the shaft 226 is the jackshaft 24 of FIG. 1, then the outer surface of the outer hub 716 can have teeth that are journaled onto helical splines on the motor shaft 18. The elements 722 cause the outer hub 716 to rotate with the inner hub 710, and the elements 722 absorb the impulse that occurs when the tool bit 42 locks or binds, hits something like a knot or nail, or is otherwise overloaded, or the spindle 40 contacts the work object. The elements 722 also absorb the constantly occurring impacts incident to normal use of the tool 9.

Figures 7, 8:
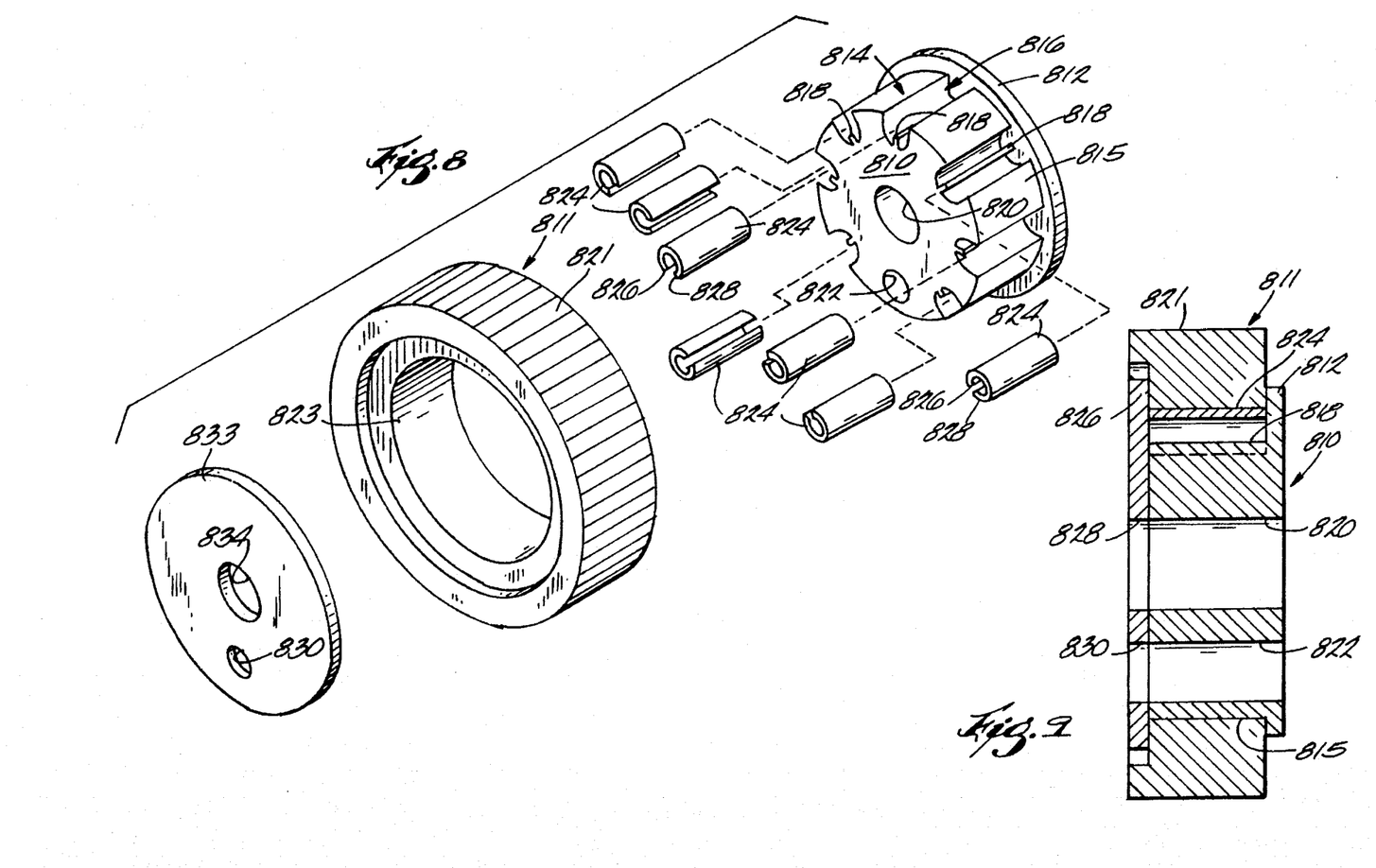
FIG. 8 is an exploded perspective view showing an alternative embodiment of the invention.

In another alternative embodiment of the invention, shown in FIGS. 8–9, there is an inner hub 810, and an outer hub 811. The inner hub 810 includes a discoidal end or flange 812, and a central portion 814 coaxial with and extending axially from the flange 812. The central portion 814 has an outer cylindrical surface 815 having a diameter less than the diameter of the flange 812. The central portion 814 includes a plurality of circumferentially spaced recesses 816 extending radially inwardly from the outer cylindrical surface 815. Although other spacing arrangements are possible, in the illustrated embodiment each recess 816 is spaced 45° from an adjacent recess 816. The central portion 814 further includes a central projection 818 in each recess 816 extending radially outwardly from a radially inwardmost, circumferentially centered, portion of each recess 816. The inner hub 810 further includes a central aperture defining an inner cylindrical surface 820 adapted to be mounted on the shaft 226, and an aperture 822 parallel and spaced apart from the central aperture. The aperture 822 is in a circumferential position where a recess 816 would otherwise be located for equal spacing between each recess 816.

The outer hub 811 includes an inner cylindrical surface 823 mounted for rotation on the outer cylindrical surface 815 of the central portion 814. The outer hub 811 further includes an outer surface 821. If the shaft 226 is the jackshaft 24 of FIG. 1, then the outer surface 821 of the outer hub 811 can have teeth that are journaled onto helical splines on the motor shaft 18.

A spring pin 824 is mounted in each recess 816 and frictionally engages the outer hub 811. Each spring pin 824 is made out of resilient metal, and has the general shape of a split hollow cylinder, or a hollow cylinder with a sector removed, to define a generally C-shaped cross section. In the illustrated embodiment, the removed sector has an acute angle. Each spring pin 824 includes surfaces 826 and 828 on either side of the removed sector or split, that generally face each other, and that are biased away from one another. The spring pins 824 are mounted in the recesses 816 with their cylinder axes parallel to the axis of rotation of the inner and outer hubs 810 and 811, and with the surfaces 826 and 828 spaced apart and by the central projection 818 in the recess 816. The central projections 818 prevent the spring pins 824 from rotating in the recesses 816.

The radially outward force of the spring pins 824 causes the outer hub 811 to rotate with the inner hub 810 except when the tool bit 42 locks or binds, hits something like a knot or nail, or is otherwise overloaded, or the spindle 40 contacts the work object, in which case the radially outward force of the spring pins 824 is overcome and the outer hub 811 rotates relative to the inner hub 810.

The outer hub 811 is axially retained on the inner hub 810 by a retaining washer 833 in the shape of a disk having an outer diameter greater than the diameter of the inner cylindrical surface 823, having a central aperture 834 with a diameter that is the same as the diameter of the inner cylindrical surface 820 of the inner hub 810, and having an aperture 830, spaced from the aperture 834, with a diameter that is the same as the diameter of the aperture 822. The aperture 830 is positioned so as to line up with the aperture 822 of the inner hub, when the central aperture 834 of the retaining washer 833 is lined up with the inner cylindrical surface 820, for securing the outer hub 811 between the retaining washer 833 and the flange 812.

Other suitable means can be employed for preventing the spring pins from rotating in the recesses. For example, in another alternative embodiment of the invention, shown in FIGS. 10–11, there is an inner hub 910, and an outer hub 911. The inner hub 910 includes a discoidal end or flange 912, and a central portion 914 coaxial with and extending axially from the flange 912. The central portion 914 has an outer cylindrical surface 915 having a diameter less than the diameter of the flange 912. The central portion 914 includes a plurality of circumferentially spaced recesses 916 extending radially inwardly from the outer cylindrical surface 915. Although other spacing arrangements are possible, in the illustrated embodiment each recess 916 is spaced 45° from an adjacent recess 916. The inner hub 910 further includes a central aperture defining an inner cylindrical surface 920 adapted to be mounted on the shaft 226, and an aperture 922 parallel and spaced apart from the central aperture. The aperture 922 is in a circumferential position where a recess 916 would otherwise be located for equal spacing between each recess 916.

Figures 10, 11:
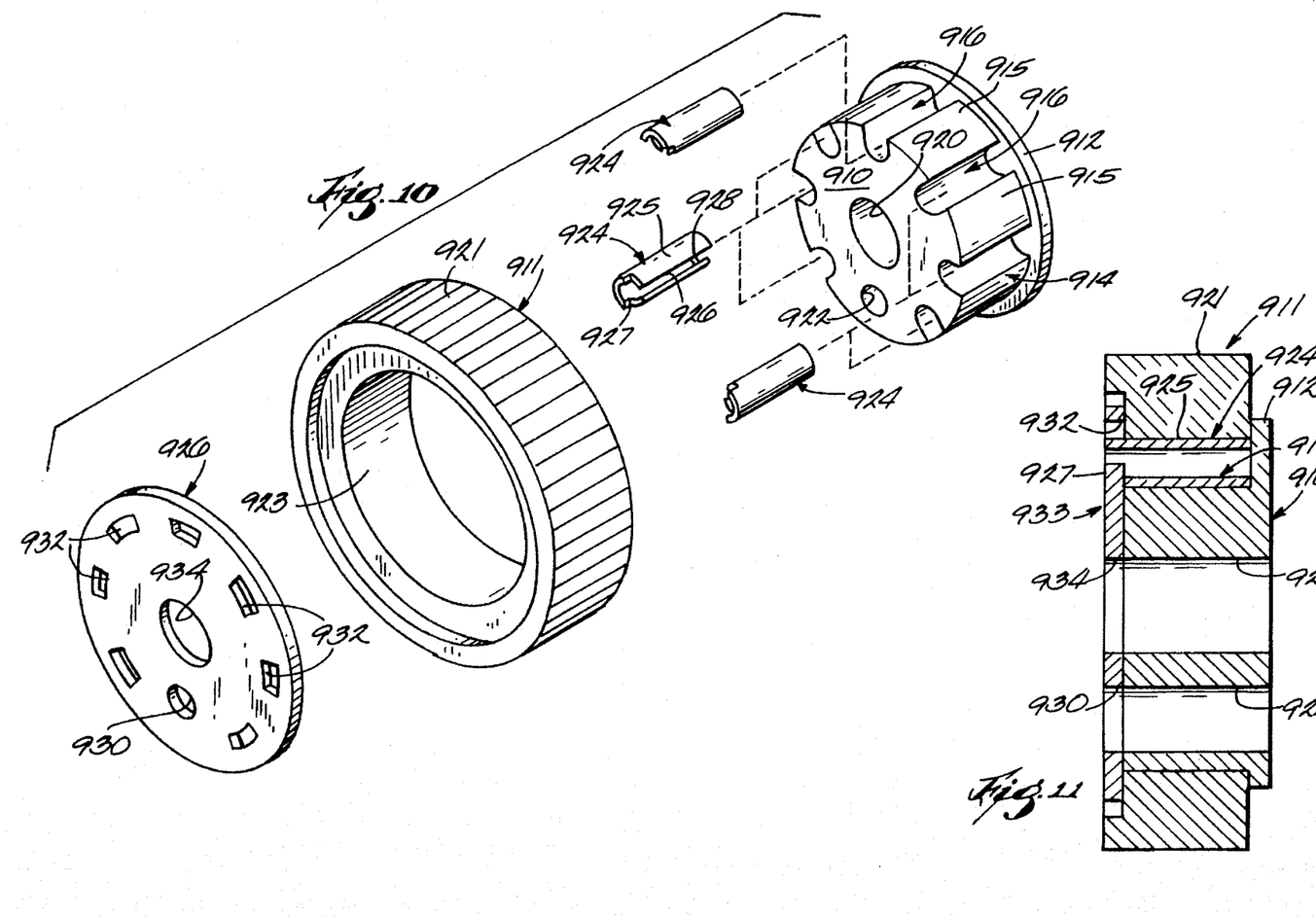
FIG. 10 is an exploded perspective view showing an alternative embodiment of the invention.
FIG. 11 is a side elevational view showing the embodiment of FIG. 10 after assembly, and in section.
Figures 12, 13:
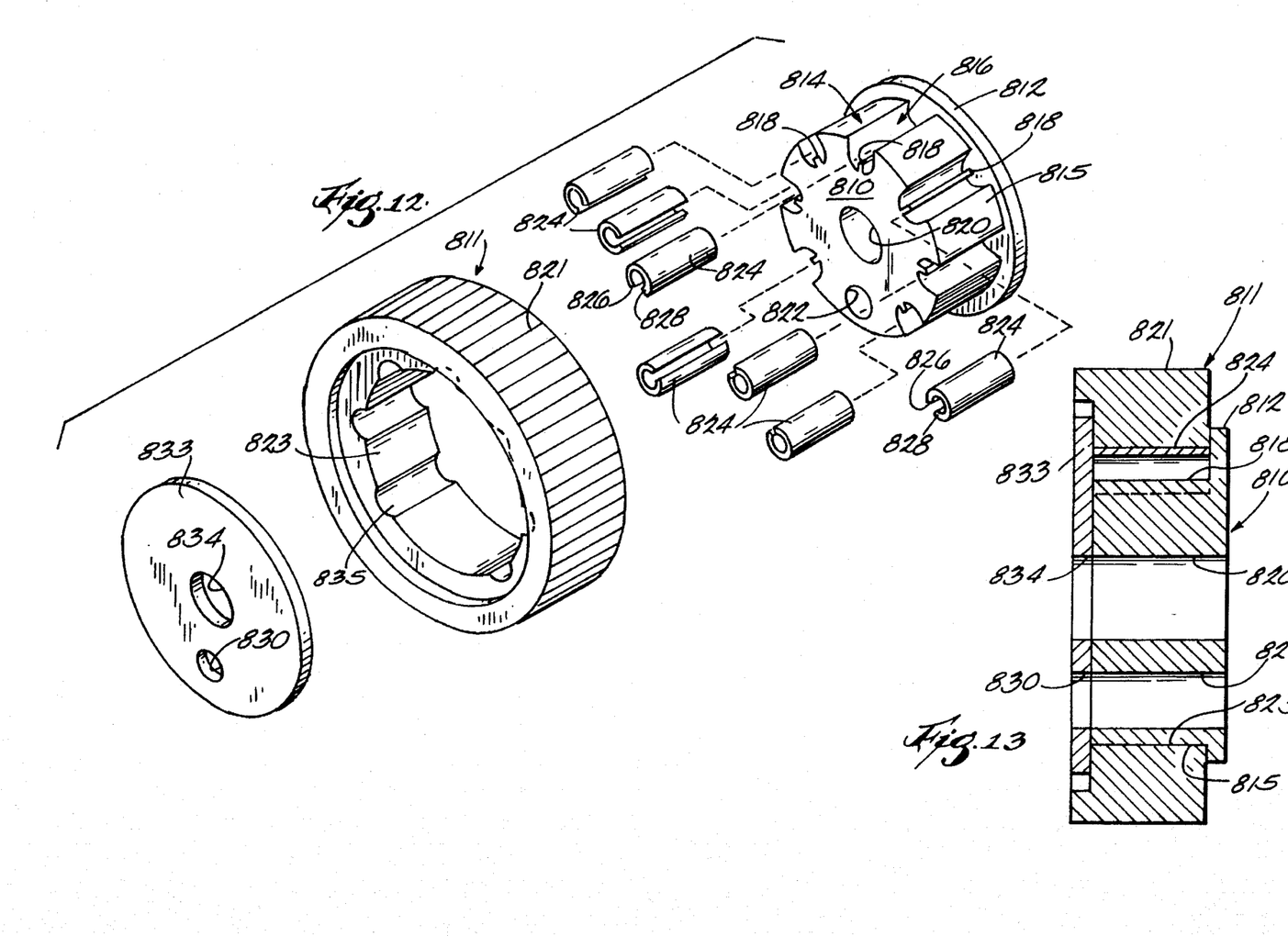
FIG. 12 is an exploded perspective view showing an alternative embodiment of the invention.
FIG. 13 is a side elevational view showing the embodiment of FIG. 12 after assembly, and in section.
Figures 14, 15:
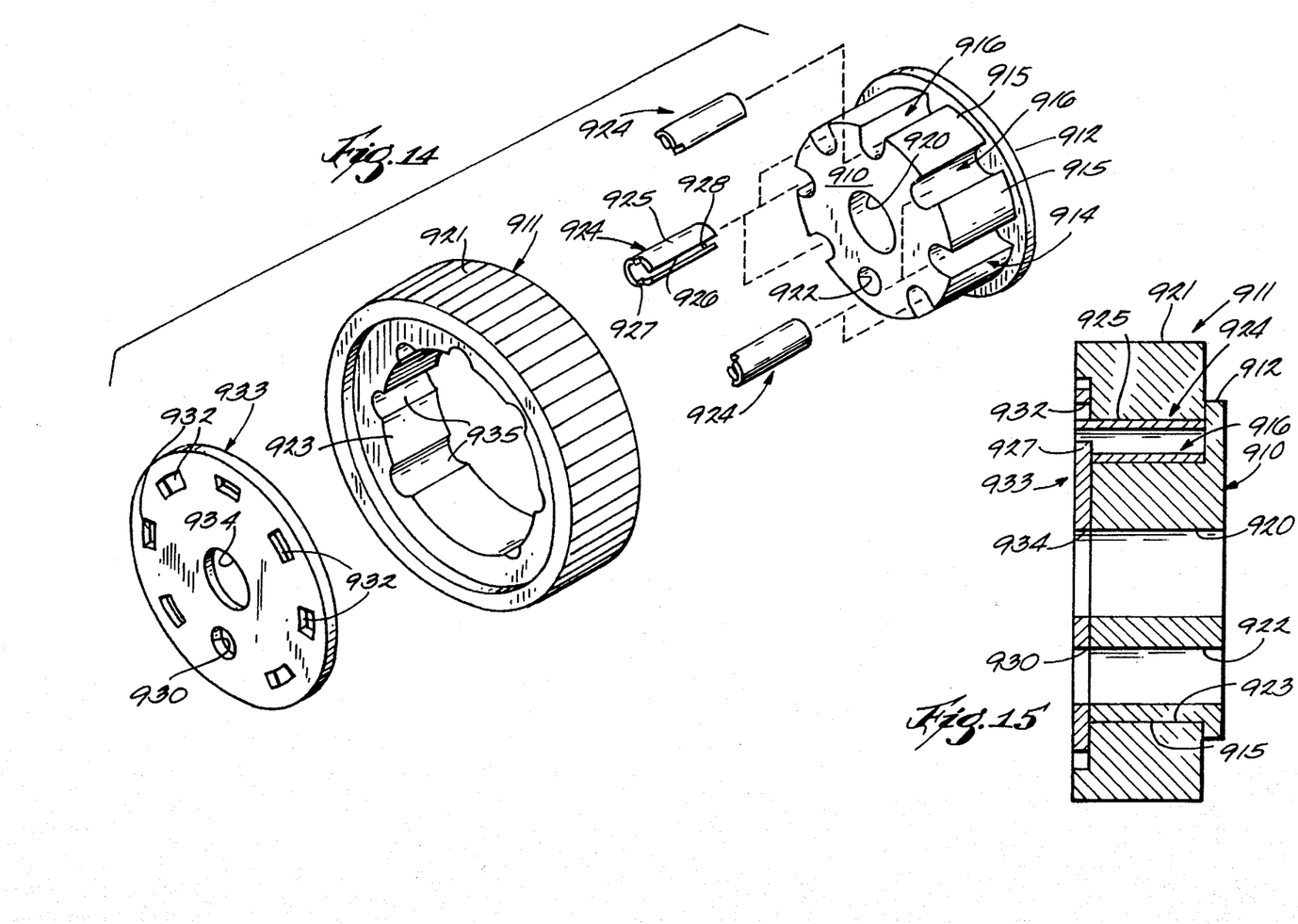
FIG. 14 is an exploded perspective view showing an alternative embodiment of the invention.
FIG. 15 is a side elevational view showing the embodiment of FIG. 14 after assembly, and in section.

The outer hub 911 includes an inner cylindrical surface 923 mounted for rotation on the outer cylindrical surface 915 of the central portion 914. The outer hub 911 further includes an outer surface 921. If the shaft 226 is the jackshaft 24 of FIG. 1, then the outer surface 921 of the outer hub 911 can have teeth that are journaled onto helical splines on the motor shaft 18.

A spring pin 924 is mounted in each recess 916 and frictionally engages the outer hub 911. Each spring pin 924 is made out of resilient metal, and has a main body portion 925 in the general shape of a split hollow cylinder, or a hollow cylinder with a sector removed, defining a generally C-shaped cross section. In the illustrated embodiment, the removed sector has an acute angle. Each spring pin 924 further has an end or head portion 927 having the same general shape of the main body portion 925 except with a lesser circumferential extent than the main body portion 925. The head portion 927 has a semi-circular cross section instead of a C-shaped cross section.

The main body portion 925 of each spring pin 924 includes surfaces 926 and 928 on either side of the removed sector or split, that generally face each other, and that are biased away from one another. The spring pins 924 are mounted in the recesses 916 with their cylinder axes parallel to the axis of rotation of the inner and outer hubs 910 and 911, and opening in the direction toward the inner cylindrical surface 920.

The radially outward force of the spring pins 924 causes the outer hub 911 to rotate with the inner hub 910 except when the tool bit 42 locks or binds, hits something like a knot or nail, or is otherwise overloaded, or the spindle 40 contacts the work object, in which case the radially outward force of the spring pins 924 is overcome and the outer hub 911 rotates relative to the inner hub 910.

The outer hub 911 is axially retained on the inner hub 910 by a retaining washer 933 in the shape of a disk having an outer diameter greater than the diameter of the inner cylindrical surface 923, having a central aperture 934 with a diameter that is the same as the diameter of the inner cylindrical surface 920 of the inner hub 910, having a plurality of circumferentially spaced apertures 932 (which will be discussed in greater detail below), and having an aperture 930, spaced from the aperture 934, with a diameter that is the same as the diameter of the aperture 922. The aperture 930 is positioned so as to line up with the aperture 922 of the inner hub, when the central aperture 934 of the retaining washer 933 is lined up with the inner cylindrical surface 920, for securing the outer hub 911 between the retaining washer 933 and the flange 912.

Each circumferentially spaced aperture 932 is located and sized to pass the head portion 927 while retaining the main body portion 925 of a spring pin 924 between the retaining washer 933 and the flange 912. Each aperture 932 is also shaped to closely receive one of the head portions 927 and prevent rotation of the head portion 927, and thus the entire spring pin 924, in the recess 916 in which the spring pin 924 is housed. Because the spring pins 924 are prevented from rotating in the recesses 916, the spring pins 924 create a frictional force between the outer hub 911 and the inner hub 910, and the outer hub 911 will rotate with the inner hub 910 unless the frictional force is overcome.

Alternative elastic-type embodiments of the invention are shown in FIGS. 12–15. These embodiments are similar to those shown in FIGS. 8–11, with two major differences. First, recesses 835 and 935 are provided in inner cylindrical surfaces 823 and 923 of the outer hubs 811 and 911. These recesses 835 and 935 are aligned with recesses 816 and 916 of the inner hubs 810 and 910, and the spring pins 824 and 924 fit within combined pairs of recesses 816 plus 835 and 916 plus 935.

Second, the spring pins 824 and 924 are made of a resilient energy absorbing material like the energy absorbing elements 722. Spring pins 824 and 924 may be made of rubber, urethane, elastomer, plastics, and other materials which can absorb energy by deforming and then return to their original shape. The spring pins 824 and 924 may also be formed of a resilient metal.

Figure 16:
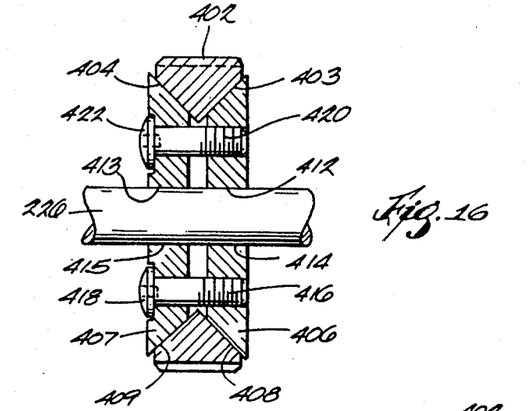
FIG. 16 is a sectional view of an alternative embodiment of the invention.

In another aspect of the invention shown in FIG. 16, the impact absorption mechanism includes a drive member 402 having a first frictionally engaging inner surface 403 and a second frictionally engaging inner surface 404. Preferably the drive member 402 is generally annular in shape and has a generally pentagonal cross section. The inner surfaces 403 and 404 are adjacent one another on the inner side of the annular drive member 402.

The inner surfaces 403 and 404 are juxtaposed in frictional engagement with a first frictionally engaging outer surface 408 of a first frictionally driven member 406 and a second frictionally engaging outer surface 409 of a second frictionally driven member 407. The outer surfaces 408 and 409 are essentially parallel to the inner surfaces 403 and 404, so as to provide a maximal amount of surface area for frictional interaction.

The driven members 406 and 407 are preferably generally frustoconical solids in shape, except for containing certain apertures described below. As can be seen in FIG. 16, the smaller circular sides of the driven members 406 and 407 are facing one another, spaced apart by the inner surfaces 403 and 404 of the drive member 402.

The driven members 406 and 407 contain one or more tensioning apertures 416. Preferably, each driven member 406 and 407 has two to eight apertures 416 that are preferably equally circumferentially spaced. It is necessary that each driven member 406 and 407 have the same number of apertures 416 and that the apertures 416 on the first driven member 406 are aligned with the apertures 416 on the second driven member 407.

Each pair of aligned apertures 416 holds a connector 420. The connectors 420 may be screws, nuts and bolts, or rivets, although screws are preferred. When the connectors 420 are screws, the second driven member 407 will preferably contain a head receiving aperture 418 coaxial with the apertures 416, into which the head 422 of each screw 420 will fit. The connectors 420 hold the driven members 406 and 407 in a fixed spaced relationship abutting the drive member 402, thereby providing a force causing a frictional engagement between the drive member 402 and the driven members 406 and 407. The amount of force applied can be changed by changing the tension in the connectors 420 so as to provide a greater or lesser force pulling the driven members 406 and 407 towards each other.

In this relationship, rotation of the drive member 402 will cause rotation of the driven members 406 and 407. The driven members 406 and 407 include inner surfaces 412 and 413 that form central apertures 414 and 415 through which the shaft 226 fits. The driven members 406 and 407 are keyed onto the shaft 226 and cause it to rotate when they do. In the preferred embodiment, the shaft 226 is the jackshaft 24, the rotation of which drives the operation of the tool bit 42. In this case, the drive member 402 can have teeth that are journaled onto helical splines on the motor shaft 18.

If a sufficient binding force is applied to the tool bit 42, this will transmit an impulse of short duration that might damage the components of the tool 9. This embodiment of the invention will absorb that impact by allowing some slippage to occur between the drive member 402 and the driven members 406 and 407. As long as the connector 420 has been set to create the appropriate amount of tension between the drive member 402 and the driven members 406 and 407, slippage will occur there before any other components of the tool 9 are damaged.

Figure 17:
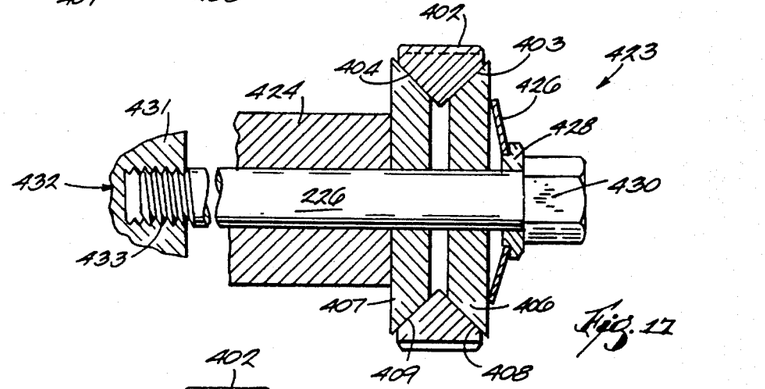
FIG. 17 is a sectional view of an alternative embodiment of the invention.

An alternative embodiment of this aspect of the invention is shown in FIG. 17. This embodiment varies from the embodiment shown in FIG. 16 mostly in that the driven members 406 and 407 are not held in a fixed, spaced relationship, but the spacing can fluctuate depending upon the forces acting upon the system.

In this embodiment, the connector 420 is not present, and instead there is a tensioning device 423 including a lateral retainer 424, a spring 426, a retaining ring 428, and one or more adjusting devices 430 and 432.

The lateral retainer 424 abuts the larger circular side of the second driven member 407 and resists its axial movement away from the drive member 402 and the first driven member 406. Preferably, the lateral retainer 424 is annular and fits onto the shaft 226. It is also preferable that the lateral retainer 424 rotates with the shaft 226 and the second driven member 407, preferably because it is keyed onto one or both. This co-rotation is not required.

The spring 426 is axially fixed on one end by the retaining ring 428, with its other end abutting the first driven member 406. In operation the spring 426 is compressed in the axial direction, and therefore is applying a force to the retaining ring 428 and the first driven member 406. It is this force that pushes the first driven member 406 against the drive member 402, and also pushes the drive member 402 against the second driven member 407, causing the members 402, 406 and 407 to be frictionally engaged. In a preferred embodiment, the spring 426 is a belleville washer.

The retaining ring 428 is preferably annular in shape and fits around and rotates with the shaft 226, although this co-rotation is not required. The retaining ring 428 is shaped to retain one end of the spring 426 and prevent the spring 426 from moving in an axial direction away from the first driven member 406. Although the retaining ring 428 shown has been especially shaped to receive the spring 426, the retaining ring 428 may be as simple as a flat washer. In some circumstances, the function of the retaining ring 428 may be served by the adjusting device 430, as when the adjusting device 430 is a nut, the rim of which extends outward from the shaft 226 sufficiently to engage and retain the spring 426.

One or more adjusting devices 430 and 432 are advantageous in the operation of this embodiment. The adjusting device 430 is preferably a nut 430 that screws onto threads (not shown) on the shaft 226. Tightening the nut 430 will cause axial movement of the nut 430 towards the first driven member 406 and simultaneous compression of the spring 426. This will increase the amount of force being applied by the spring 426 to the driven members 406 and 407 and the drive member 402, and increase the amount of frictional force connecting these members. Loosening the nut 430 will have the opposite effect. Therefore the amount of frictional force holding together the drive member 402 and the driven members 406 and 407 may be adjusted to the desired level.

A second adjusting device 432 may be provided in addition to or in place of the adjusting device 430. The second adjusting device 432 is preferably located at an end of the shaft 226 opposite the spring 426. By screwing the shaft 226 further into an axially fixed receiver 431, the shaft 226 is drawn to the left as viewed in FIGS. 16 and 17. In this embodiment the lateral retainer 424 is axially fixed but not keyed onto the shaft 226. Therefore, axial movement of the shaft 226 will also cause axial movement of the retaining ring 428, and simultaneous compression or decompression of the spring 426.

As mentioned previously, the driven members 406 and 407 are not in an axially fixed relationship. If a binding force is applied to the tool bit 42 it will be transmitted to the shaft 226 and then to the driven members 406 and 407. If this binding force is strong enough to overcome the spring force applied by the spring 426, the frictional force holding together the driven members 406 and 407 against the drive member 402 will also be overcome, and slippage will occur. Simultaneously, the binding force will cause axial movement of the first driven member 406 away from the drive member 402 and into the spring 426. This will add to the flexion and compression of the spring 426. The spring 426 will force the first driving member 406 back into an abutting relationship with the drive member 402 almost instantly, and this process may repeat until the binding force is no longer present or the motor stalls.

Figure 18:
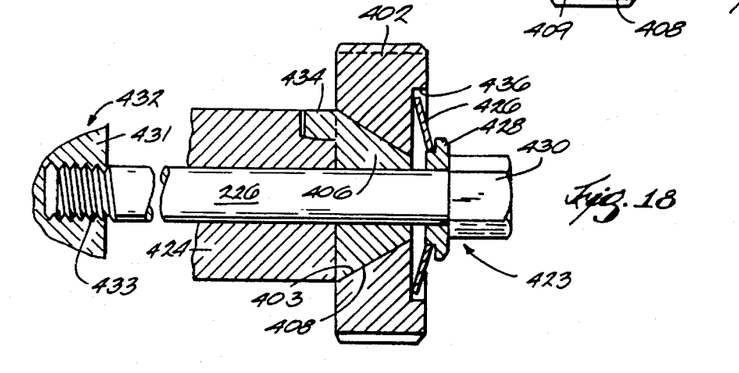
FIG. 18 is a sectional view of an alternative embodiment of the invention.
Figure 19:
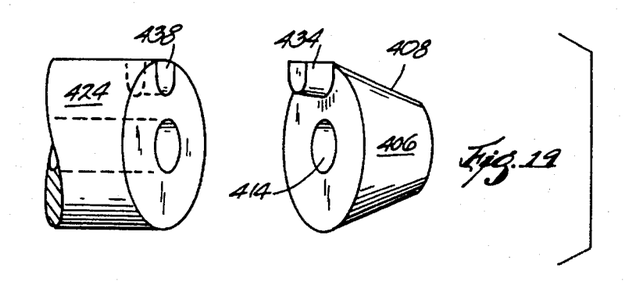
FIG. 19 is an exploded perspective view of the first driven member and lateral retainer of FIG. 18.

Another embodiment of the invention is shown in FIGS. 18 and 19. This embodiment differs from that shown in FIG. 17 primarily in that there is no second driven member 407. In this embodiment the impact absorption mechanism includes the drive member 402, the first driven member 406, the lateral retainer 424, the spring 426, the retaining ring 428, and one or more adjusting devices 430 and 432.

The first driven member 406 includes the first outer surface 408 as before. The first outer surface 408 frictionally engages the first inner surface 403 of the drive member 402 when the members 402 and 406 are forced into a mating engagement.

It is important in this embodiment that the surfaces 403 and 408 not be parallel to the shaft 226. As can be seen in FIG. 18, these surfaces 403 and 408 get closer to the shaft 226 as one moves axially down the shaft 226 from the lateral retainer 424 to the spring 426. Preferably, the angle formed between the surfaces 403 or 408 and the shaft 226 is between about 30° and 60°. Most preferably, this angle is 45°. In this embodiment the spring 426 contacts the drive member 402 at a notch 436 instead of the first driven member 406, and pushes the drive member 402 into mating engagement with the first driven member 406.

The spring 426, retaining ring 428, and adjusting devices 430 and 432 work as in the embodiment shown in FIG. 17.

Also shown in FIGS. 18 and 19 is an appendage 434 on the first driven member 406. The appendage 434 engages a notch 438 on the lateral retainer 424. This keys together the rotation of the lateral retainer 424 and the first driven member 406. The appendage 434 may be used on this embodiment, or the embodiment shown in FIG. 17. Other methods of keying together the rotation of the lateral retainer 424 and the first driven member 406 will be apparent to those of skill in the art.

While various impact absorption mechanisms have been described in connection with a reciprocating saw, it should be understood that the various impact absorption mechanisms can be employed in electric tools which include driven and driving shafts, other than electric saws. It should also be understood that the invention may be used in tools containing rotating as well as reciprocating drive mechanisms.

One aspect of the invention provides a hand held electric tool including a motor, a driving shaft, a driven shaft, and a impact absorption mechanism in driven engagement between the driving shaft and the driven shaft, which impact absorption mechanism activates to provide slippage between the driving shaft and the driven shaft only at a torque higher than the stalling torque of the motor. For example, any of the mechanisms disclosed above in connection with FIGS. 1–6, 8–11, and 16–19 can be configured to slip only at a torque higher than the stalling torque of the motor. Thus, the motor stalls when the tools encounters an unexpected impediment to operation, preventing harm to the motor, and the impulse caused by the impediment is absorbed by the impact absorption mechanism.

Another aspect of the invention provides an elastic-type impact absorption mechanism that absorbs all impacts occurring to the tool 9, not just those that exceed a predetermined amount. This aspect can prevent damage to components of the tool 9 that might occur when the tool bit 42 locks or binds, or when other sorts of major impacts occur. However, this aspect can also help reduce the wear-and-tear on the tool 9 through absorbing minor impacts that occur during normal use.

While impact absorption mechanisms have been described in connection with a reciprocating drive mechanism that includes wobble plates, it should be understood that the impact absorption mechanisms can be used in reciprocating drive mechanisms that include other means for converting rotary motion into reciprocating motion. It should also be understood that the various impact absorption mechanisms can be employed in tools or apparatuses other than reciprocating saws or other tools including reciprocating and/or rotating drive mechanisms. It should also be understood that the impact absorption mechanisms could be located at other locations in the tool; for example, an impact absorption mechanism can be located closer to the tool bit, or an impact absorption mechanism can be provided between slip motor shafts. The illustrated embodiments have been found to provide a more economical location for the impact absorption mechanism.

Modifications may be made to the preferred embodiment described and illustrated herein without departing from the spirit of the invention as expressed in the following claims.

I claim:

1. A handheld portable tool comprising:

a housing;

a first shaft rotatably mounted in the housing;

a motor shaft that stalls at a stall torque;

a spindle;

a tool bit driven by the spindle and adapted to operate on a workpiece;

means, mounted on the first shaft and connected to the spindle, for converting rotational motion of the first shaft to reciprocal motion of the spindle; and means for drivingly connecting the motor shaft to the first shaft and providing slippage between the motor shaft and the first shaft if there is binding of the spindle, wherein said means for providing slippage includes a clutch drivingly connecting said motor shaft to said first shaft, said clutch providing slippage between said motor shaft and said first shaft at a slippage torque that is equal to or greater than the stall torque of said motor shaft.

2. A handheld portable tool as claimed in claim 1, wherein said spindle is mounted for reciprocation within said housing.

3. A handheld portable tool as claimed in claim 1, wherein said converting means includes a wobble plate mounted on said first shaft.

4. A handheld portable tool as claimed in claim 1, further comprising a motor drivingly connected to said motor shaft.

5. A handheld portable tool comprising:

a housing;

a shaft rotatably mounted in the housing;

a motor having a stall torque; and a clutch drivingly connecting said motor to said shaft, said clutch providing slippage between said motor and said shaft at a torque that is equal to or greater than the stall torque of said motor.

6. A handheld portable tool as claimed in claim 5, further comprising:

a spindle mounted for reciprocation within said housing; and means, mounted on the first shaft and connected to said spindle, for converting rotational motion of said shaft to reciprocal motion of said spindle.

7. A handheld portable tool as claimed in claim 6, wherein said converting means includes a wobble plate mounted on said shaft.

* * * * *